UNITED STATES PATENT OFFICE.

EDWARD R. STOWELL, OF PORTLAND, INDIANA, ASSIGNOR TO HOWARD L. NORRIS AND HARVEY A. ARBAUGH, BOTH OF PORTLAND, INDIANA.

PLASTIC COMPOSITION.

1,364,004. Specification of Letters Patent. Patented Dec. 28, 1920.

No Drawing. Application filed April 27, 1920. Serial No. 377,094.

*To all whom it may concern:*

Be it known that I, EDWARD R. STOWELL, a citizen of the United States of America, residing at Portland, in the county of Jay, State of Indiana, have invented new and useful Plastic Compositions, of which the following is a specification.

This invention relates to a plastic composition for use in the manufacture of brick, hollow tile, and general insulating and fire resisting products, ordinarily made from clay, gypsum, magnesia, asbestos, etc.

One of the objects of the present invention is to prepare a plastic composition which is light, fireproof, waterproof, and of considerable strength, it being possible to use the composition not only for these purposes, but also as a plaster, as a floor covering, and for like purposes.

With the foregoing and other objects in view, the invention consists of the following ingredients, substantially in the proportions stated, said proportion being by volume, Coal ashes_____ 50 parts,
Sodium silicate_____ 12 parts,
Ground talc_____ 8 to 10 parts.

To fifteen (15) parts of the above mixture may be added one or two parts of Portland cement, this addition not being necessary under all conditions.

In making the composition, the ashes should be screened through a fine mesh screen: Fifty (50) parts screened ashes are mixed with twelve (12) parts of sodium silicate, so as to produce a thick paste or dough, and after these two ingredients have been thoroughly mixed the ground talc is added. These parts are then mixed thoroughly and afterward placed in molds or any other containers. If desired, a suitable coloring matter may be added before the composition is molded.

After the molded composition has hardened, it is removed from the mold and put aside to dry.

When it is desired to make bricks from the composition it is first molded into bricks, after which the bricks are placed in a furnace or kiln and heated to a high temperature for from one to two hours.

When it is desired to give the composition considerable strength, cement can be added thereto, in the proportions before stated. When cement is used the products need not be subjected to heat in a kiln or furnace.

What is claimed is:

1. A plastic composition including coal ashes, sodium silicate, ground talc and Portland cement.

2. A plastic composition consisting of coal ashes, approximately 50 parts, sodium silicate, approximately 12 parts, ground talc, approximately 10 parts and combined with Portland cement.

In testimony whereof, I claim the foregoing as my own. I have hereunto affixed my signature, in the presence of two witnesses.

EDWARD R. STOWELL.

Witnesses:
AUBREY L. STOWELL,
RAYMOND JOURNEY.